Dec. 30, 1924.　　　　　　　　　　　　　　　　　　　1,520,799
G. R. BICKFORD
DRAFT PREVENTING DEVICE
Filed March 30, 1922　　2 Sheets-Sheet 1
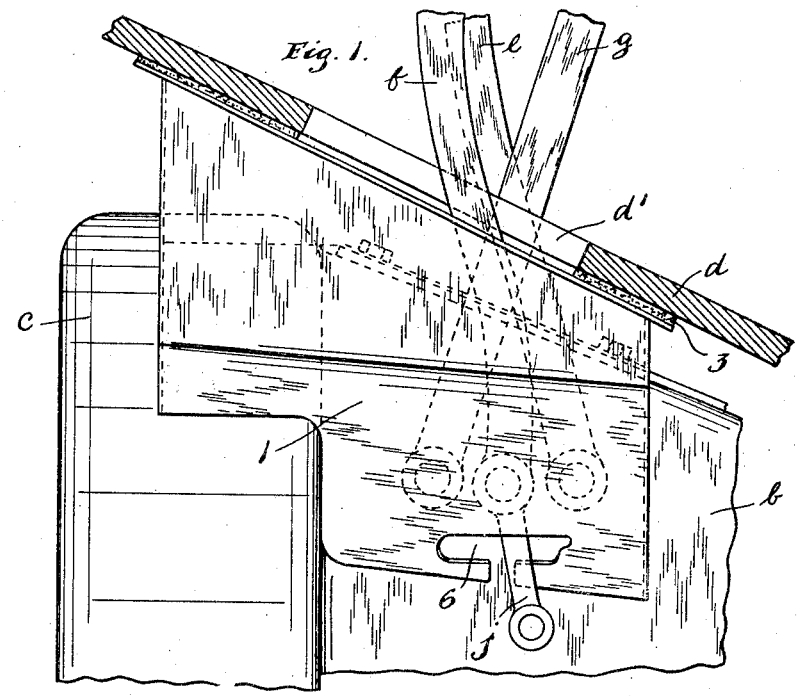
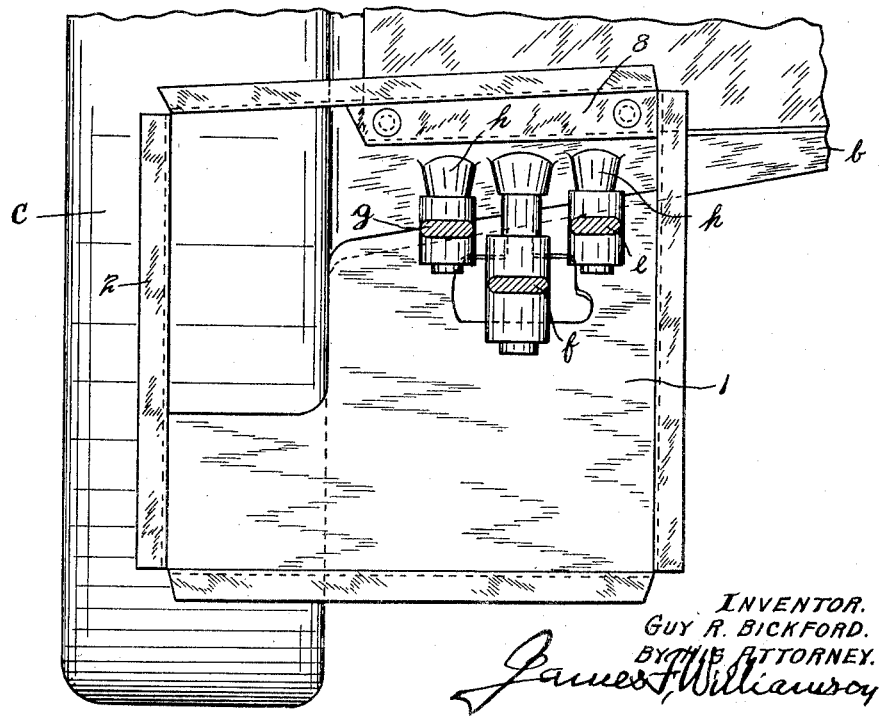
INVENTOR.
GUY R. BICKFORD.
BY HIS ATTORNEY.

Dec. 30, 1924.

G. R. BICKFORD 1,520,799

DRAFT PREVENTING DEVICE

Filed March 30, 1922  2 Sheets-Sheet 2

INVENTOR.
GUY R. BICKFORD.
BY HIS ATTORNEY.
James F. Williamson

Patented Dec. 30, 1924.

1,520,799

UNITED STATES PATENT OFFICE.

GUY R. BICKFORD, OF WAYZATA, MINNESOTA, ASSIGNOR OF ONE-HALF TO HARRY V. PETTITT, OF WAYZATA, MINNESOTA.

DRAFT-PREVENTING DEVICE.

Application filed March 30, 1922. Serial No. 547,989.

*To all whom it may concern:*

Be it known that I, GUY R. BICKFORD, a citizen of the United States, residing at Wayzata, in the county of Hennepin and State of Minnesota, have invented certain new and useful Improvements in Draft-Preventing Devices; and I do hereby declare the following to be a full, clear, and exact description of the invention, such as will enable others skilled in the art to which it appertains to make and use the same.

This invention relates to an automobile, especially an automobile of the Ford type and said invention is particularly directed to a draft preventing device adapted to be disposed adjacent the foot board where the clutch, brake and transmission levers pass through the same. In automobiles of the Ford type, there is quite an opening through the foot board where these levers come through and in cold weather a strong draft from the outside atmosphere passes upward through these openings, which is very uncomfortable to the driver. In the summer time, in very warm weather, owing to the heat of the engine, a draft of hot air passes upward through these openings, which is also very uncomfortable for the driver. It is an object of this invention, therefore, to provide means enclosing said opening through the foot board and the levers passing through said board, so that the passage of air upward through the foot board about the levers is effectively prevented.

It is a further object of the invention to provide such a means comprising a casing of sheet material disposed below the foot board and having openings through which said levers pass said openings being closed by said casing abutting against the engine casing.

It is a still further object of the invention to provide such a casing which is thus adapted to surround said levers and be closed by contact with the engine casing save for a small opening through which a connection for one of the levers passes.

These and other objects and advantages of the invention will be fully set forth in the following description made in connection with the accompanying drawings, in which like reference characters refer to the same parts throughout the different views, and in which,—

Fig. 1 is a view in side elevation of the device and associated parts, the foot board being shown in section;

Fig. 2 is a plan view of the device and associated parts the levers being sectioned.

Figure 3:
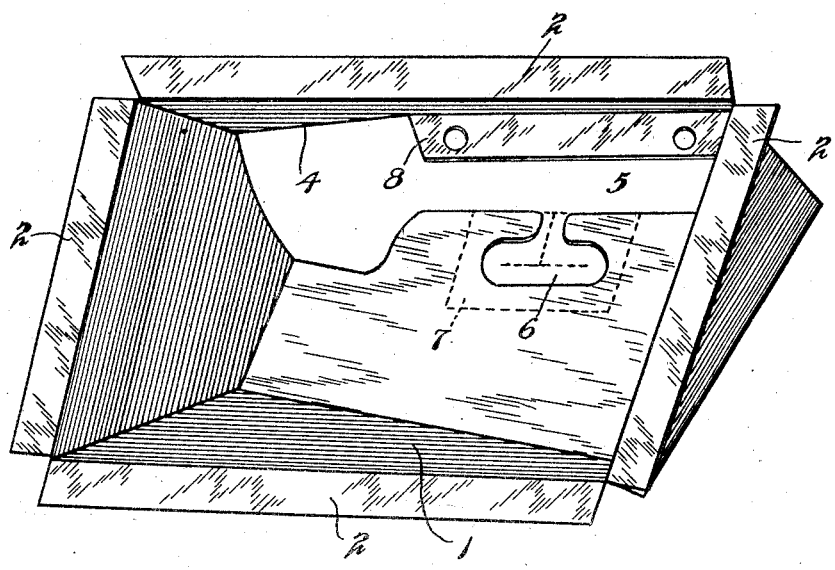
Fig. 3 is a plan view or the casing proper.

Referring to the drawings:

A portion of the engine casing of an automobile is shown as $b$ having a fly wheel enclosing portion $c$. The foot board is shown as $d$ and a plurality of levers $e$, $f$ and $g$ are shown as extending upwardly through an opening $d$ in said foot board. The levers $e$ and $g$ in the Ford automobile and automobiles of similar type extend downward only to bosses $h$ projecting from the engine casing. The lever $f$ while being pivoted to the bosses $h$ has an extension $j$ extending beyond said boss.

In accordance with the present invention, a casing designated generally as 1 is provided which casing is illustrated as being of substantially rectangular shape in cross section and having a flange portion 2 disposed about the same. This flange portion 2 is adapted to be disposed in parallel relation with or in close proximity to the foot board. The said flange can either be placed directly against the foot board or a packing 3 of felt or similar material may be disposed between the same and the foot board. The casing 1 is provided at one end and in its bottom portion with a cut-out portion 4. When the casing is placed in position, this portion 4 and the end and side wall adjacent the same, abut against the curved surfaces of the fly wheel casing $c$, said casing thus serving as a support and a closure for said opening. The casing also has an opening 5 extending from the opening 4 through its bottom portion and when the said casing is placed in position, this opening and the parts of the sides adjacent therethrough abut against the sides of the engine casing $b$. The lower end of the levers $e$ and $g$ and the bosses $h$ pass into the opening 5 and are thus enclosed and surrounded by the said casing 1. To accommodate the extension $j$, a T-shaped opening 6 is formed at the bottom of the casing, constructed and arranged to permit the necessary movements of said connection. This is the only opening in the casing, extending toward the free exterior thereof and the size of said opening is small compared to the size of the casing. A layer 7 of felt or similar material may be secured to the inside or outside of the casing covering the opening 6, said felt having a T-shaped slit cut therein, the lines of which are disposed centrally of the portions of the openings 6. The connection $j$ can thus move freely in said slit and the felt will engage the sides thereof and effectively close the opening 6. Casing 1 is further provided with an inwardly extending flange 8 adapted to contact with a flat top portion of the engine casing $b$ to which it is secured preferably by screws or bolts.

With the described structure, it is seen that the opening $d'$ through the foot board $d$ in which the levers $e$, $f$ and $g$ operate, is effectively closed by the casing 1 co-operating with the engine casings $c$ and $b$. Any draft of air upward through said opening $d'$ is thus effectively prevented and yet the operation of the levers is not in any way interfered with or obstructed. The casing 1 is made of sheet material, preferably sheet metal and can be quite inexpensively made and easily and quickly installed on a Ford automobile or similar type car. The efficiency of the device has been amply demonstrated in actual practice and it has great utility in adding to the comfort of the driver.

It will, of course, be understood that various changes may be made in the form, details, arrangement and proportions of the parts without departing from the scope of applicant's invention, which generally stated consists in the manner shown and described and set forth in the appended claim.

A layer of felt may also be inserted between the casing 1 and the fly wheel or engine casing.

What is claimed is:

The combination with an automobile having control levers extending through an opening in the foot board and with the engine casing thereof, of a casing having an opening adapted to abut against said engine casing so as to be closed thereby, said casing being adapted to enclose said levers having only a small opening extending toward the free exterior thereof, said opening accommodating a connection to one of said levers, said casing having a sectional flange extending about its top edge adapted to fit against said foot board beneath the same.

In testimony whereof I affix my signature.

GUY R. BICKFORD.